(12) United States Patent
Liao (10) Patent No.: US 6,342,999 B1
(45) Date of Patent: Jan. 29, 2002

(54) CURRENT SURGE ABSORBING WIRE WINDING BOX

(76) Inventor: Sheng-Hsin Liao, No. 10, Alley 38, Lane 229, San Chun St., Shu Lin, Taipei Hsien (TW)

( * ) Notice: Subject to any disclaimer, the term of this patent is extended or adjusted under 35 U.S.C. 154(b) by 0 days.

(21) Appl. No.: 09/481,558

(22) Filed: Jan. 11, 2000

(51) Int. Cl.$^7$ .................................................. H02H 1/00
(52) U.S. Cl. ................................................... 361/118
(58) Field of Search ................................ 361/117, 118

(56) References Cited

U.S. PATENT DOCUMENTS

| | | | | |
|---|---|---|---|---|
| 5,289,335 A | * | 2/1994 | Kato ........................... | 361/117 |
| 5,629,826 A | * | 5/1997 | Roca et al. ................. | 361/118 |
| 5,700,158 A | * | 12/1997 | Neiser et al. ............... | 439/501 |
| 6,198,136 B1 | * | 3/2001 | Voldman et al. ............ | 257/357 |

* cited by examiner

Primary Examiner—Peter S. Wong
Assistant Examiner—Pia Tibbits (74) Attorney, Agent, or Firm—Rosenber, Klein & Lee (57) ABSTRACT

A current surge absorbing wire winding box comprises a housing, a rotary disk, a communication wire, and a spiral spring. The rotary disk is rotatably received in a receiving groove within the housing, and a first ring and a second ring are formed around the center through holes on two surfaces of the rotary disk so that the communication wire and the spiral spring can wind around the first ring and the second ring. Characterized in that a circuit board with a surge absorption element is installed on the first ring of the rotary disk, a surge absorption device with two clamping covers and a plurality of inserting terminals. By the two clamping covers to clamp the communication wire, and one end of the inserting terminal is inserted into the clamping cover to the respective conductive wire, while another end is welded to the circuit board so that each surge absorption element can be electrically connected to each loop coil in parallel. Therefore, when in using the wire winding box, if the user is impact by thunderbolt or other abnormal electricity, the surge impact can be absorbed immediately. Thus, the software and hardware of the communication electronic devices are avoided to be damaged.

4 Claims, 7 Drawing Sheets

CURRENT SURGE ABSORBING WIRE WINDING BOX

FIELD OF THE INVENTION

The present invention relates to a wire winding box, and especially to a current surge absorbing wire winding box, in using to a notebook computer or various communication electronic devices, so that the communication wire can be retained in a preferred length, while the wire winding box is not used, the communication wire can be wound automatically so that the hardware and software of the communication electronic devices is protected not to be damaged by surge absorption wave.

BACKGROUND OF THE INVENTION

Nowadays, despite of computers, modems, telephones, facsimile, or various communication electronic devices are necessary to use proper communication wires for electrical connection. However, too long wire will cause the wire to be wound in proper, thus, various wire winding boxes are developed. The basic structure of these wire winding boxes includes a housing, one or two rotary disks, one or two spiral springs and one or two communication wires. For example, the prior art wire winding box is pivotally installed with a rotary disk. The rotary disk is controlled by a spiral spring, and moreover, a communication wire can wind around the rotary disk. Therefore, one end of the communication plug of the communication wire is inserted into the related communication devices, while the communication plug at another end is inserted into a predetermined communication plug for providing a path for loading or unloading information.

However, the notebook computers and other communication electronic devices have many compact and expensive electronic parts. Moreover, often many important data are stored in the devices, it is very important for the stability of the current supply and voltage supply. An over large or over small voltage and current will cause the data in the software is damaged or lose, or cause the hardware to be destroyed. Especially, when the communication wire is beat by thunderbolt or some abnormal electric factor so that a surge of current or voltage occurs, it will induce the software or hardware of the notebook computer or other communication electronic devices to be destroyed. Therefore, it is eagerly to have a novel wire winding box having the function of current surge absorbing to prevent the above said problem.

SUMMARY OF THE INVENTION

Accordingly, the primary object of the present invention is to provide a current surge absorbing wire winding box. Once a transient surge impact occurs by thunderbolt or other abnormal electric power to generate a high voltage or a large current. Then, the surge absorption element will function to absorb the power sufficient. Therefore, the loop coil still retains in the original low voltage and low current. Thereby, the damages of the software and hardware of notebook computers or various compact and expensive communication electronic devices are avoided. In the present invention, a special surge absorption device is installed within the wire winding box, which is electrically connected in parallel to each pair of conductive wire in the communication wire. Thus, hen using the wire winding box, if the user is impact by thunderbolt or other abnormal electricity, the surge impact can be absorbed immediately. Thus, the software and hardware of the communication electronic devices are avoided to be damaged.

The various objects and advantages of the present invention will be more readily understood from the following detailed description when read in conjunction with the appended drawing.

DETAILED DESCRIPTION OF THE PREFERRED EMBODIMENTS

Figure 1:
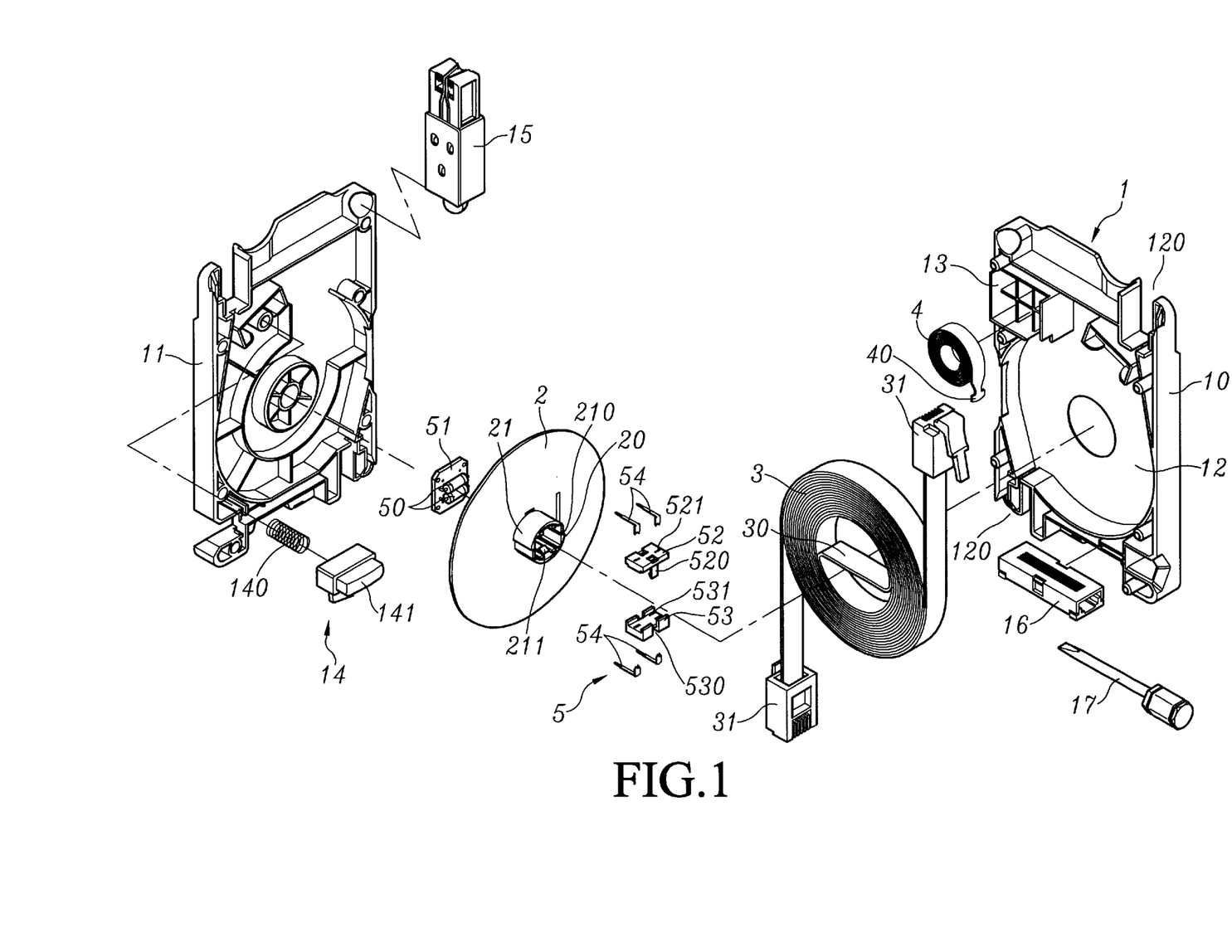
FIG. 1 is an exploded perspective view of the present invention.

With reference to FIG. 1, the exploded perspective view about a preferred embodiment of the current surge absorbing wire winding box of the present invention is illustrated. The wire winding box according to the present invention includes a housing 1, a rotary disk 2, a communication wire 3, and a spiral spring 4.

The housing 1 is formed by two opposite and coupled half cases 10 and 11. One of the half case 10 is formed with an approximate round receiving groove 12 and the side of the receiving groove 12 is formed with a cavity 13. The periphery of the housing 1 is disposed with two wire outlets 120 communicated with the receiving groove 12 at a proper places.

Figure 2:
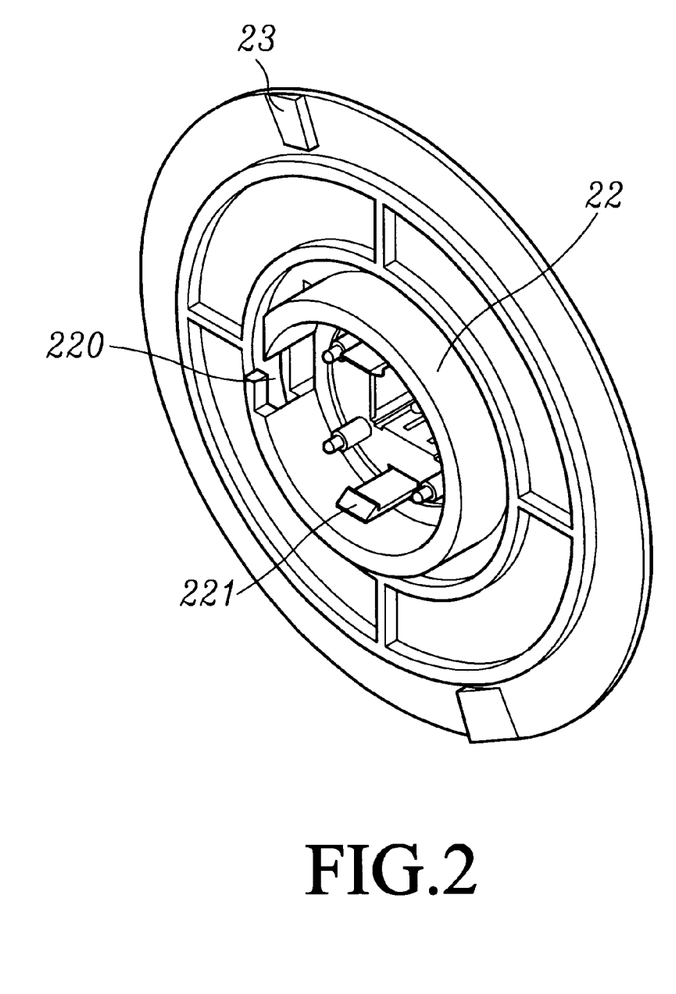
FIG. 2 is a perspective view showing the disk surface of the rotary disk according to the present invention.

The rotary disk 2 is rotatably received in the receiving groove 12 and is installed with a through hole 20. A disk surface is formed with a first rotary ring 21 at the outer ring of the through hole 20. Two opposite sides of the first ring 21 are installed with slots 210. Thereby, the central fixing section 31 of the communication wire 3 can be embedded into the slots 210 for being fixed, while the remained wire is wound around the first ring 21. Two wire ends thereof are assembled with respective communication plugs 31 for penetrating through the two wire outlets 120. As shown in FIG. 2, another disk surface is formed with a second ring 21 at the outer ring portion of the through hole 20. One side of the second ring is formed with a hooking groove 220 so that after the spiral spring 4 has been received within the cavity 13, the hook 40 will hook the hooking groove 220 for controlling the rotary disk 2. Therefore, the rotary disk 2 generates an elastic force having a rewinding restoring ability. Therefore, as it is used, the user only needs to pull the two communication plugs 31 outwards. Then, a section with a desired length can be pulled out to be inserted into a communication electronic device and a communication plug. Then, by the restoring elasticity of the spiral spring 4, the communication wire 3 will retain to a predetermined tension so as to reduce the length of the wire exposed outwards. No complex winding occurs in the communication wire 3.

Figure 3:
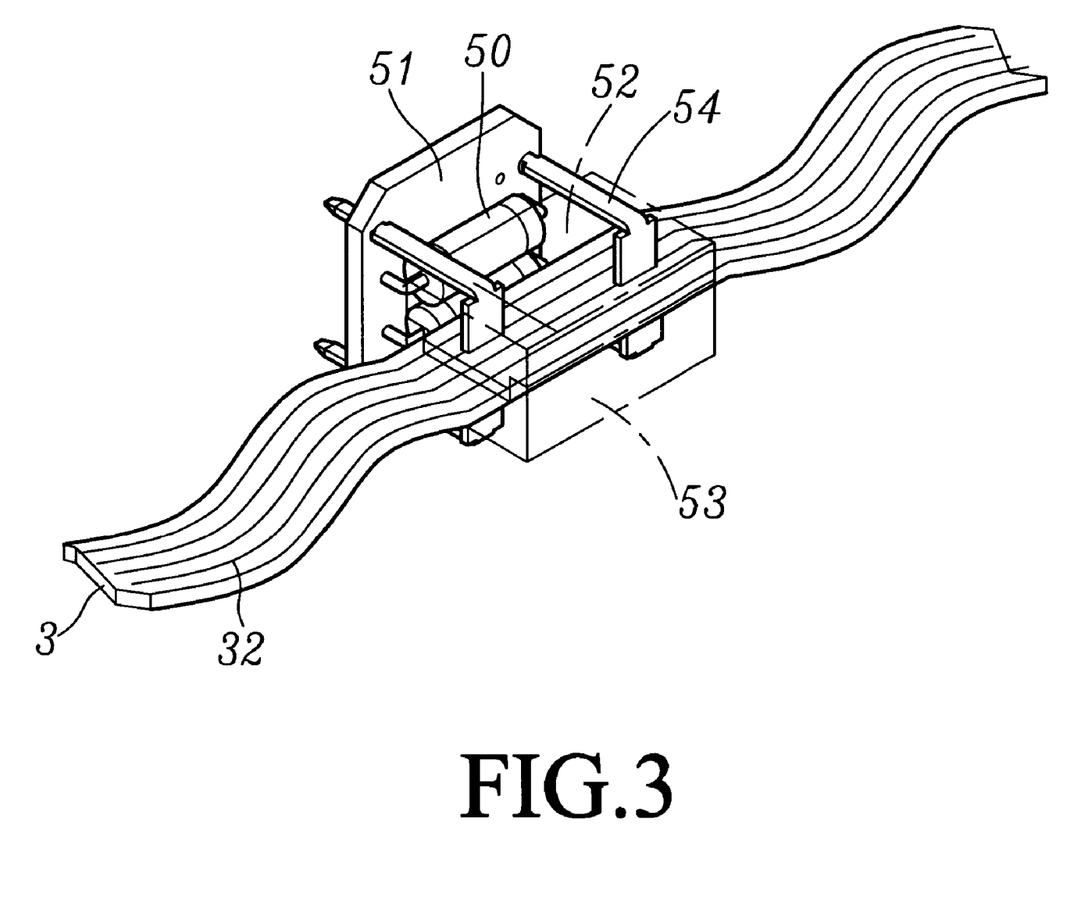
FIG. 3 is a schematic perspective view showing the surge absorption device of the present invention clamping a communication wire.
Figure 4:
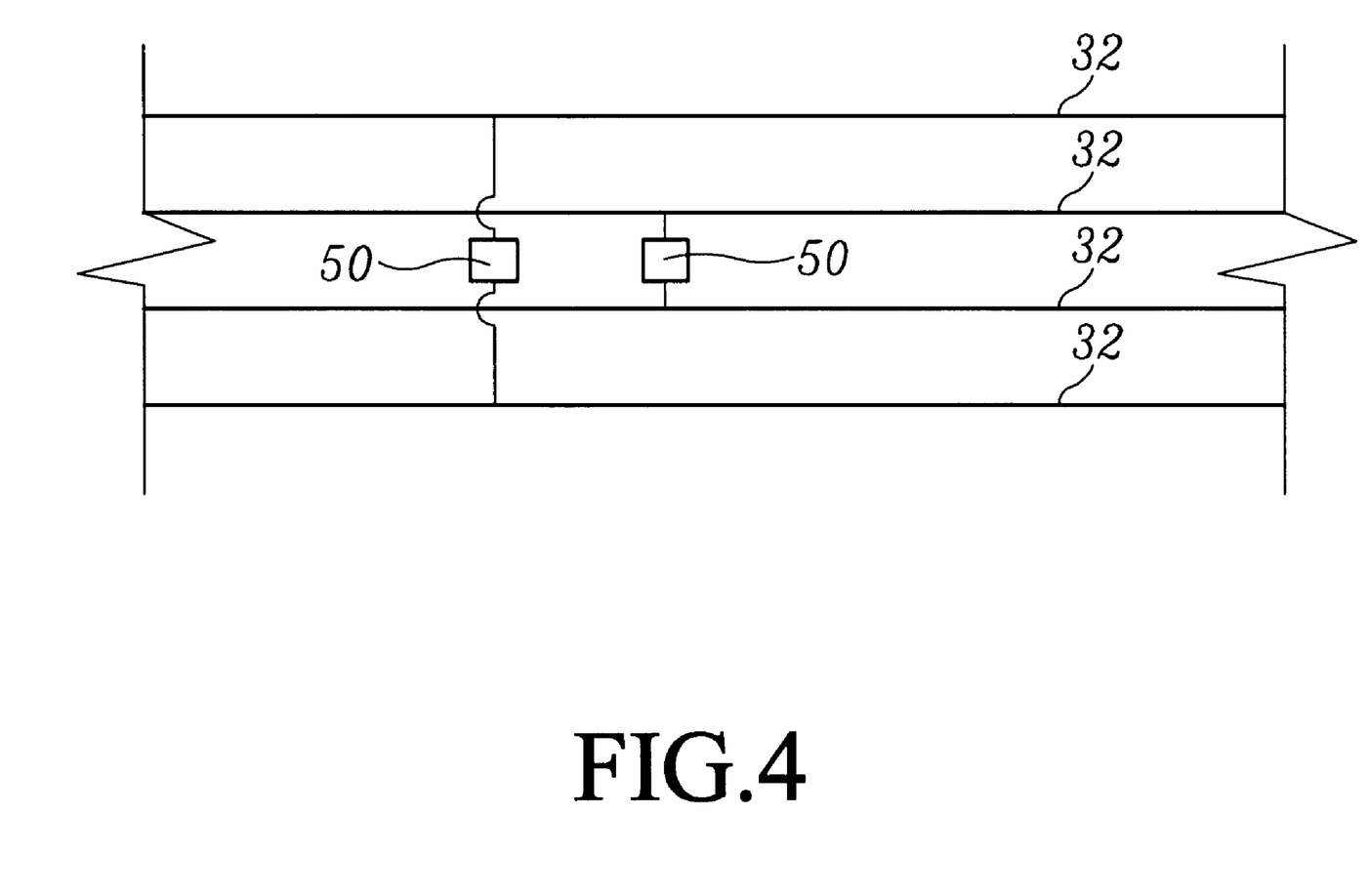
FIG. 4 is a simple schematic view showing the surge absorption device and the communication wire being connected in parallel.
Figure 5:
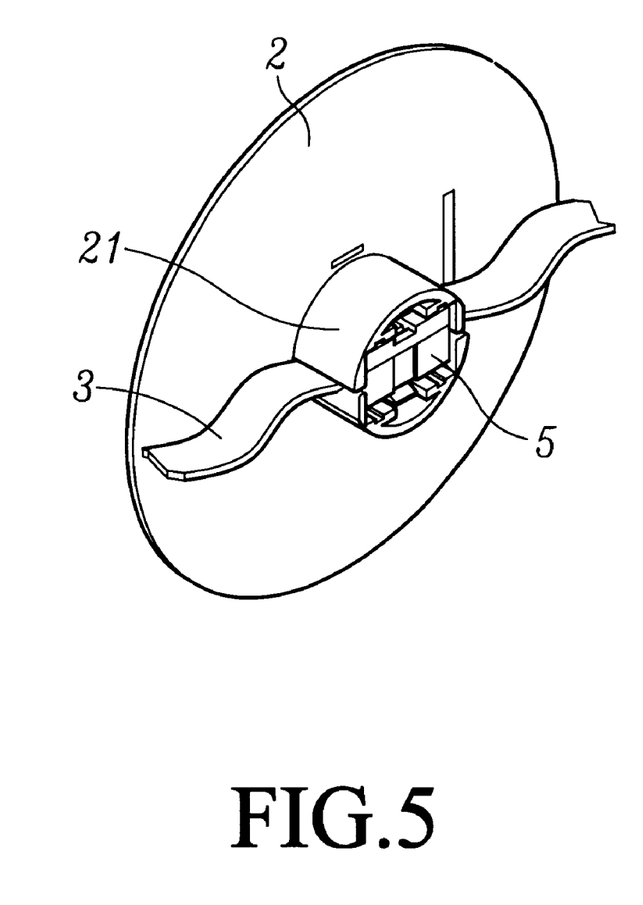
FIG. 5 is a perspective view showing the rotary disk of the present invention combined with a surge absorption device.

For example, the communication wire 3 described above is a four lines transmission line used in general telephone. As shown in FIGS. 3 and 4, four conductive wires 32 is disposed therewithin so that two conductive wires is formed as an inner loop coil and the other two conductive wires is formed as another loop coil. In general, only the inner loop coil is used in the signal transmission. In order to match the four line communication wire 3, a surge absorption device 5 is installed at the through hole 20 of the rotary disk 2, the surge absorption device 5 includes a circuit board 51 connected to two surge absorption elements 50, a first clamping cover 52, a second clamping cover 53 and four inserting terminals 54. The second clamping cover 52 has two sides installed with hooks 520. At corresponding positions of two sides of the second clamping cover 53 are installed with buckling grooves 530 so that the first clamping cover 52 and the second clamping cover 53 can be clamped to the fixing section 30 positioned at the first ring 21. At positions of the two clamping cover correspondent to the four conductive wires 32 of the communication wire 3 are installed with two inserted holes 521, 531, respectively. Thereby, each inserting terminal 54 can be inserted into a correspondent conductive wire 52 (as shown in FIG. 3). While another welding end is welded to the circuit board 51 so as to be electrically connected to the surge absorption element 50, as shown in FIG. 4, and therefore, two surge absorption elements 50 can be connected to the inner loop coil and outer loop coil in parallel. The clamped two clamping covers and circuit board 51 can be placed in the first ring 21 and the second ring, respectively, so to be hooked by hooks 211 and 221 to be positioned, as shown in FIG. 5.

Therefore, in general use, since the surge absorption element 50 has a larger resistance, the signals can be transferred reciprocally in the inner loop coil or the outer loop coil with a predetermined voltage or current. However, once a transient surge impact occurs by thunderbolt or other abnormal electric power to generate a high voltage or a large current. Then, the surge absorption element 50 will function to absorb the power sufficient. Therefore, the loop coil still retains in the original low voltage and low current. Thereby, the damages of the software and hardware of notebook computers or various compact and expensive communication electronic devices are avoided.

Moreover, in order that the communication wire 3 being pulled out can be fixed in the desired length for being wound in a proper time so that one surface of the rotary disk 2 is installed with a triangular buckling block 23. Moreover, a buckling device 14 formed by an elastic element 140 and a button 141 is installed at a lateral side of the receiving groove 12 so that as the communication wire 3 has been pulled out to a predetermined length and then is released, it can be fixed. While as the button 141 is pressed, it can be rewound smoothly (referring to the application Ser. No. 09/339,845 assigned to the applicant of the present invention). Besides, one side of the housing 1 may be installed with a detector 15 for detecting the conduction of various loop coils of the communication plugs (referring to Ser. No. 09/339,845), and installed with an adaptor 16 for being connected in series by the communication plug (referring to Ser. No. 09/339,845), and installed with an opener 17 for pulling out the communication plug from a communication receptacle as an elastic buckle is broken uncarelessly.

Figure 6:
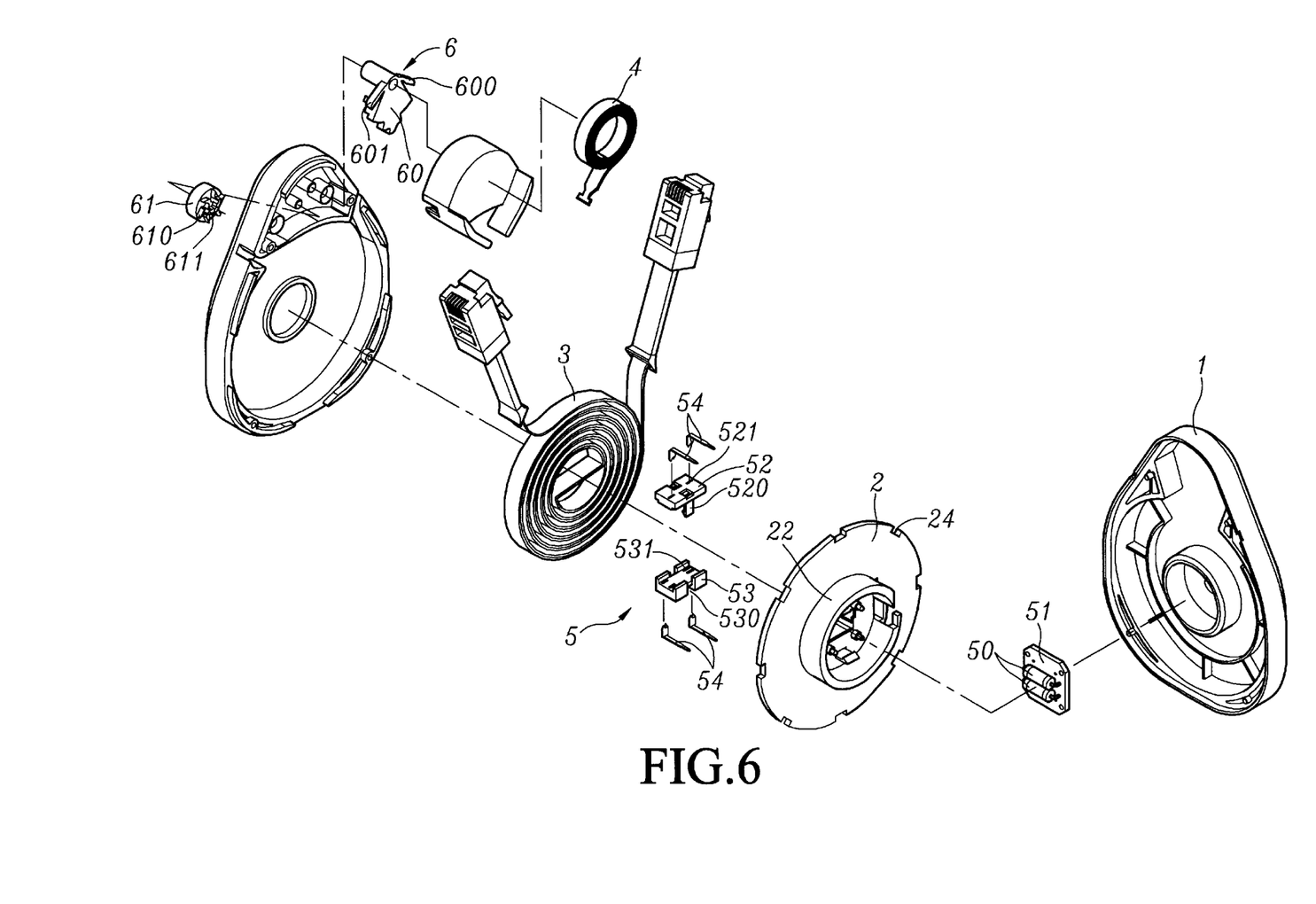
FIG. 6 is an exploded perspective view showing the present invention being combined to a wire winding box of another type.
Figure 7:
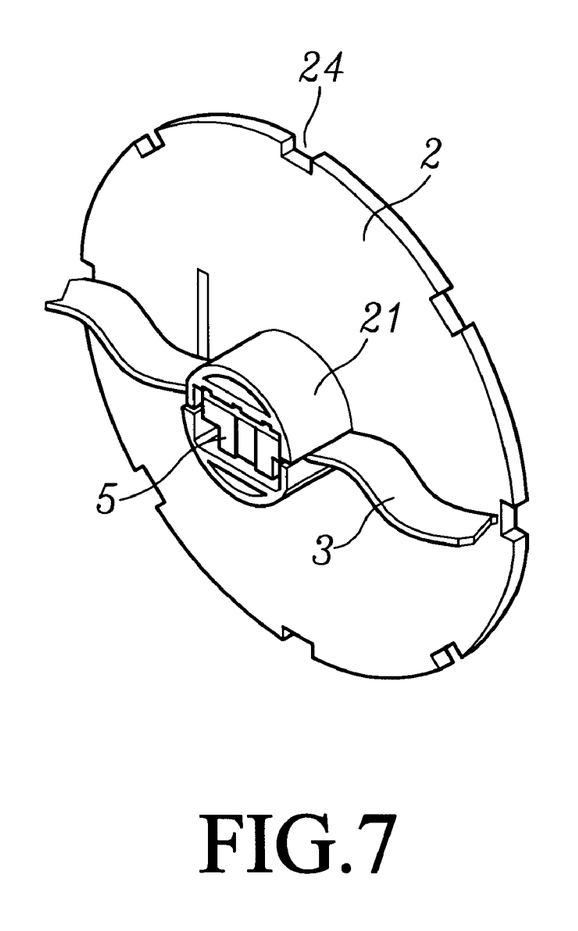
FIG. 7 is a perspective view showing the rotary disk in the embodiment of FIG. 6 being combined with a surge absorption device.

The aforesaid surge absorption device not only can be used in the wire winding box disclosed in FIG. 1, in fact, it can be used in various wire winding boxes. For example, the wire winding box disclosed in application Ser. No. 09/377,422 assigned to the applicant of the present invention, as shown in FIG. 6. Simplely, this wire winding box is similar to the aforesaid example, which includes a housing 1, a rotary disk 2, a communication wire 3, and a spiral spring 4. While a plurality of buckling grooves 24 are installed at the periphery and a reciprocal controlling device 6 is installed at the position adjacent the rotary disk 2. Thus, the reciprocal control device 6 includes a swinging piece 60 having two elastic pieces 600, two brakes 601 and an engaging block, and a ratchet wheel 61 having a plurality of ratchet teeth 610 and buckling blocks 611 and adjacent to the ratchet wheel 61. By the special interaction between the swinging pieces 60, ratchet wheel 61 and buckling groove 24 of the rotary disk 24, the communication wire 3 can be fixed or wound by reciprocal pulling. The center of the rotary disk 2 is similar to the aforesaid structure, and between the first cover and the second cover is installed with a surge absorption device 5 having a circuit board 51 with two surge absorption elements 50, a first clamping cover 52, a second clamping cover 53 and four inserting terminals 54 (as shown in FIG. 7). The two rings are clamped and then are electrically connected to the communication wire 3. Similarly, the effect of thunderbolt-proof and preventing damage of surge to the communication electronic devices are achieved.

In summary, the current surge absorbing wire winding box of the present invention has the effect of thunderbolt-proof and preventing damage of surge to the communication electronic devices. Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A current surge absorbing wire winding box, comprising:

a housing including two half cases and having a receiving groove defined therebetween, two wire outlets being formed at respective spaced apart locations of the periphery of said receiving groove;

a rotary disk rotatably disposed within said receiving groove, a first ring and a second ring being formed at the centers of two opposite surfaces of said rotary disk, said first and second rings having walls thereof extending axially from said opposite surfaces of said rotary disk in opposite directions, said walls of said first ring having a pair of radially aligned slots formed therein, and said walls of said second ring having a hooking groove formed therein;

a communication wire having two portions thereof extending lengthwise adjacent one to the other and forming a plurality of pairs of loop coils and a central fixed section integrally joining said two portions of said communication wire, each said portion of said communication wire having an end extended through a respective one of said two wire outlets, said communication wire having a plurality of conductive wires;

a spiral spring secured within a cavity formed in said housing in proximity to said receiving groove, said spiral spring having an end thereof engaged within said hooking groove of said second ring of said rotary disk, said spiral spring being wound around said second ring by rotational movement of said rotary disk; and a surge absorption device installed within said walls of said first ring on said rotary disk, said surge absorbing device including:
(a) a circuit board;
(b) at least one surge absorption element on said circuit board electrically connected to two conductive wires in a respective loop coil of said communication wire in parallel therewith,
(c) a first clamping cover and a second clamping cover attached one to the other and defining a receiving opening therebetween, said central fixed section of said communication wire being clamped within said receiving opening and extending through said slots formed in said walls of said first ring at said rotary disk, each of said first and second clamping covers having a plurality of inserting holes formed at predetermined locations thereat, and
(d) a plurality of inserting terminals, each having a first end thereof welded to said circuit board to be electrically connected to said at least one surge absorbing element, and a second end thereof inserted into a respective one of said plurality of the inserting holes for electrical engagement with a respective pair of said conductive wires of said communication wire.

2. The current surge absorbing wire winding box as claimed in claim 1, wherein two sides of said first clamping cover include hooks, and two sides of said second clamping cover include hooking grooves aligned with said hooks formed at said first clamping cover, said hooks and hooking grooves being buckled once said central fixed section of said communication wire being clamped within said receiving opening formed between said first and second clamping covers.

3. The current surge absorbing wire winding box as claimed in claim 1, wherein said first ring and second ring of said rotary disk include hooks buckled to said at least one surge absorption element.

4. The current surge absorbing wire winding box as claimed in claim 1, wherein said communication wire has four conductive wires forming two loop coils, and wherein said surge absorption device includes two surge absorption elements, said surge absorption elements being electrically connected to the two conductive wires of each loop coil in parallel.

* * * * *